US010793468B2

(12) United States Patent
Torfs et al.

(10) Patent No.: US 10,793,468 B2
(45) Date of Patent: *Oct. 6, 2020

(54) METHOD OF MANUFACTURING AN ETCHED GLASS ARTICLE

(71) Applicant: AGFA-GEVAERT NV, Mortsel (BE)

(72) Inventors: Rita Torfs, Mortsel (BE); Frank Louwet, Mortsel (BE); Johan Loccufier, Mortsel (BE); Mark Lens, Mortsel (BE)

(73) Assignee: AGFA-Gevaert NV

( * ) Notice: Subject to any disclaimer, the term of this patent is extended or adjusted under 35 U.S.C. 154(b) by 0 days.

This patent is subject to a terminal disclaimer.

(21) Appl. No.: 16/080,405

(22) PCT Filed: Feb. 24, 2017

(86) PCT No.: PCT/EP2017/054284
§ 371 (c)(1),
(2) Date: Aug. 28, 2018

(87) PCT Pub. No.: WO2017/148809
PCT Pub. Date: Sep. 8, 2017

(65) Prior Publication Data
US 2019/0084872 A1 Mar. 21, 2019

(30) Foreign Application Priority Data
Feb. 29, 2016 (EP) .................................... 16157785

(51) Int. Cl.
*H01L 21/308* (2006.01)
*C03C 15/00* (2006.01)
(Continued)

(52) U.S. Cl.
CPC .............. *C03C 15/00* (2013.01); *C03C 17/28* (2013.01); *C03C 17/32* (2013.01); *C09D 11/101* (2013.01);
(Continued)

(58) Field of Classification Search
CPC ........... H01L 21/0234; H01L 21/30604; H01L 21/3065; H01L 21/30655; H01L 21/31053;
(Continued)

(56) References Cited

U.S. PATENT DOCUMENTS

2008/0142477 A1    6/2008  Jacobs
2009/0191654 A1*   7/2009  Yu .................... B29D 11/00634
                                                              438/29
(Continued)

FOREIGN PATENT DOCUMENTS

WO    2004/106437 A1    12/2004
WO    2006/087320 A1     8/2006
(Continued)

OTHER PUBLICATIONS

Official Communication issued in International Patent Application No. PCT/EP2017/054284, dated Apr. 13, 2017.
(Continued)

*Primary Examiner* — Thomas T Pham
(74) *Attorney, Agent, or Firm* — Stinson LLP

(57) ABSTRACT

A method of manufacturing an etched glass article includes the steps of jetting an image with a UV curable inkjet ink on a surface of the glass article; UV curing the image; etching the surface not covered by the UV cured image to obtain an etched image; and removing the UV cured image in an aqueous alkaline solution; wherein the UV curable inkjet ink includes a polymerizable composition, wherein at least 80 wt % of the polymerizable composition consists of: a) 15.0
(Continued)

to 70.0 wt % of an acryl amide; b) 20.0 to 75.0 wt % of a polyfunctional acrylate; and c) 1.0 to 15.0 wt % of a (meth)acrylate containing a carboxylic acid group, a phosphoric acid group or a phosphonic acid group-; with all weight percentages (wt %) based on the total weight of the polymerizable composition.

15 Claims, 3 Drawing Sheets

(51) Int. Cl.
    C03C 17/28    (2006.01)
    C03C 17/32    (2006.01)
    C09D 11/101   (2014.01)
    C09D 11/107   (2014.01)
    C09D 11/30    (2014.01)

(52) U.S. Cl.
    CPC ............ *C09D 11/107* (2013.01); *C09D 11/30* (2013.01); *C03C 2218/119* (2013.01); *C03C 2218/34* (2013.01); *C03C 2218/355* (2013.01)

(58) Field of Classification Search
    CPC ............. H01L 21/31055; H01L 21/311; H01L 21/31105; H01L 21/31111; H01L 21/31116; H01L 21/31127; H01L 21/31133; H01L 21/31138; H01L 21/3213; H01L 21/32133; H01L 21/32135; H01L 21/32136; H01L 21/47573
    See application file for complete search history.

(56) References Cited

U.S. PATENT DOCUMENTS

| | | | |
|---|---|---|---|
| 2011/0216124 A1* | 9/2011 | Maeda | C09D 11/101 |
| | | | 347/20 |
| 2014/0045966 A1* | 2/2014 | Motofuji | C08F 2/48 |
| | | | 522/183 |
| 2014/0083458 A1* | 3/2014 | Fuchigami | H01L 21/31133 |
| | | | 134/12 |
| 2015/0191391 A1 | 7/2015 | Sinapi et al. | |
| 2015/0212413 A1* | 7/2015 | Umeda | G03F 7/027 |
| | | | 428/195.1 |
| 2015/0247055 A1* | 9/2015 | Takahashi | C09D 11/101 |
| | | | 427/511 |

FOREIGN PATENT DOCUMENTS

| | | |
|---|---|---|
| WO | 2009/083468 A1 | 7/2009 |
| WO | 2013/189762 A1 | 12/2013 |

OTHER PUBLICATIONS

Torfs et al., "Method of Manufacturing an Etched Glass Article," U.S. Appl. No. 16/080,400, filed Aug. 28, 2018.
Torfs et al., "Method of Manufacturing an Etched Glass Article," U.S. Appl. No. 16/080,411, filed Aug. 28, 2018.

* cited by examiner

METHOD OF MANUFACTURING AN ETCHED GLASS ARTICLE

CROSS REFERENCE TO RELATED APPLICATIONS

This application is a 371 National Stage Application of PCT/EP2017/054284, filed Feb. 24, 2017. This application claims the benefit of European Application No. 16157785.3, filed Feb. 29, 2016, which is incorporated by reference herein in its entirety.

BACKGROUND OF THE INVENTION

1. Field of the Invention

The present invention relates to selective etching of glass, for example for decorative purposes, more specifically to etching of glass using inkjet technology.

2. Description of the Related Art

A preferred selective chemical etching method to obtain a specific pattern on the surface of a glass article uses a protective mask, which is resistant to the etching treatment, making it possible to expose only certain parts of the surface of the glass to the etching treatment. The protective mask is then removed after the etching treatment. The obtained etched pattern is thus the negative of the protective mask applied beforehand.

WO2006/087320 (GLAVERBEL) and WO2009/083468 (AGC) disclose a method to selectively etch a glass surface wherein a protective layer composed of a low-temperature melting wax is deposited by screen printing, by a hot applicator or by inkjet technology on the glass surface.

The deposition of a wax by inkjet printing requires heating the printheads at temperatures high enough to melt the wax, which then cools and hardens on contact with the colder glass surface. Keeping the printheads at higher temperatures may have a negative impact on the lifetime of the printhead. Another disadvantage may be a poor stability of an inkjet ink comprising a wax.

In WO2013/189762 (AGC) the protective layer is provided by an inkjet method using a UV curable inkjet ink. The UV curable inkjet ink comprises N-vinyl-caprolactam, an acrylate monomer, a photoinitiator and a glycol ether acrylate.

A problem with the removal of the protective layer is flake formation in the alkaline stripping bath. Stripping solutions are normally solutions of alkaline metal hydroxides, such as sodium or potassium hydroxide, or based on amines such as mono or tri ethanolamine and tetra methyl ammonium hydroxide. The stripping solution breaks the polymer chain at the cross-linking point of the three dimensional structure, which is formed during the polymerization of the resist and before the bond between the resist and the glass surface is broken. In order to extend the working lifetime of the stripping solution, it is necessary to filter the solution to remove the stripped flake of resist. If the flake size is too large it tends to adhere to stripping equipment disturbing the smooth running of the manufacturing process. If the flakes are too small they pass through the filter and return in the stripping bath. After a while these small flakes accumulate and also start to disturb the smooth running of the manufacturing process. These very small flakes tend to block the nozzles of the sprays of the stripping line.

The flakes may also redeposit on the etched glass surface and for example become stuck in the etched patters, necessitating an additional cleaning step.

The stripped flake size depends mainly on the type of stripping solution, the concentration of the stripping solution, the temperature of the stripping solution and the design of the stripping equipment, etc. This multitude of influencing factors makes it very difficult to control the flake size to a desired size.

Hence, there remains a need for improved low viscous radiation curable inkjet inks suitable for reliable inkjet printing in an industrial etching process applicable to a wide range of etchants and etching conditions and exhibiting no problems with stripping and flake formation.

SUMMARY OF THE INVENTION

Preferred embodiments of the present invention provide an improved manufacturing method of a selectively etched glass article to overcome the above mentioned flake size problem.

The advantages and benefits of the preferred embodiments of the present invention are realized by the manufacturing method described below.

Further advantages and embodiments of the present invention will become apparent from the following description.

DETAILED DESCRIPTION OF THE PREFERRED EMBODIMENTS

Definitions

Figure 1:
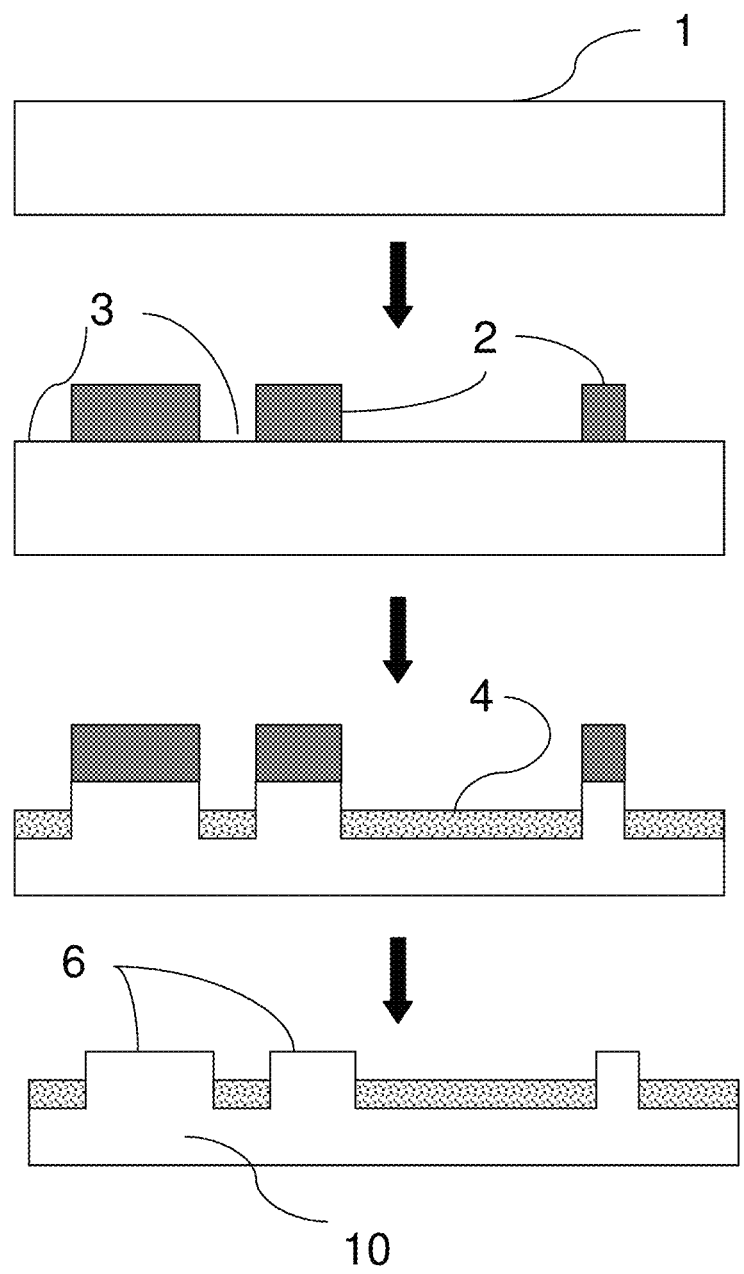
FIG. 1 illustrates a preferred embodiment for manufacturing an etched glass article. First, a UV cured image (2) is printed on a glass surface (1). Then, during an etching step, glass is etched away in those areas which are not protected by the UV cured image (3) while the glass surface protected by the UV cured image remains substantially intact. After removal of the UV cured image an etched glass article (10) is obtained comprising etched areas (4) and smooth areas (6).
Figure 2:
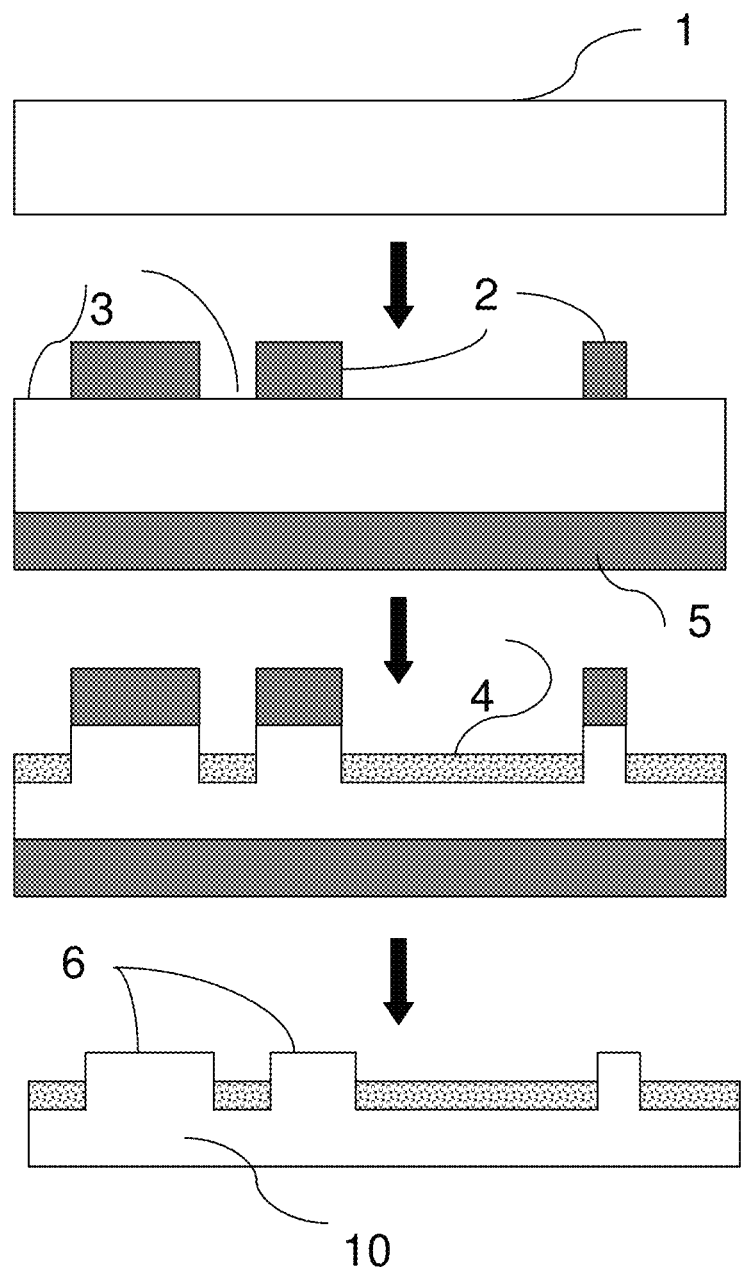
FIG. 2 illustrates another embodiment for manufacturing an etched glass article wherein a second surface of the glass sheet is completely covered by a UV cured layer (5) to protect that surface from the etching solution.

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_2O$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

In the invention, etching of the glass is understood to mean the removal of a certain amount of material at the surface of the glass, giving a translucent/scattering aspect to the glass, a specific texture and sometimes roughness. The term "chemical etching" is used when the removal of material is carried out by chemical attack/reaction.

Manufacturing Method of Selectively Etching a Glass Article

The method of manufacturing an etched glass article (10) according to a preferred embodiment of the invention includes the steps of:

a) jetting an image (2) with a UV curable inkjet ink on a surface (1) of a glass article; b) UV curing the image (2); c) etching the surface not covered by the UV cured image (3) to obtain an etched image (4); and d) removing the UV cured image (2) in an aqueous alkaline solution; wherein the UV curable inkjet ink comprises a polymerizable composition and wherein at least 80 wt % of the polymerizable composition consists of: a) 15.0 to 70.0 wt % of an acryl amide; b) 20.0 to 75.0 wt % of a polyfunctional acrylate; and c) 1.0 to 15.0 wt % of a monofunctional (meth)acrylate containing a carboxylic acid group, a phosphoric acid group or a phosphonic acid group; with all weight percentages (wt %) based on the total weight of the polymerizable composition.

In preferred embodiment of the method, UV curing in step b) is carried with UV LEDs.

The time between jetting and curing the image is preferably at least 50 ms, more preferably at least 75 ms, most preferably at least 100 ms. UV radiation that is reflected from the glass surface towards the inkjet print heads used to print the image may cause clogging of the nozzles of the inkjet print heads.

It has been observed that clogging of the nozzles of the inkjet print heads may be prevented when the time between jetting and curing is as described above.

In a preferred embodiment, the time between jetting and curing the image is less than 750 ms, more preferably less than 600 ms, most preferably less than 500 ms.

It has been observed that the resolution of the image may decrease when the time between jetting and curing becomes too high, due to spreading of the inkjet ink on the glass surface between jetting and curing the inkjet ink.

In a preferred embodiment, the glass surface is cleaned before printing the UV curable inkjet ink. This is especially desirable when the glass surface is handled by hand and no gloves are worn. The cleaning removes dust particles and grease which can interfere in the adhesion of the UV curable inkjet ink to the glass surface.

In another preferred embodiment of the method the UV cured image is preferably given a heat treatment, preferably 10 to 45 minutes at 130 to 170° C., more preferably 20 to 30 minutes at 150° C., before etching, preferably between the UV curing step b) and the etching step c).

Suitable heating devices include devices circulating hot air, ovens, and infrared radiation sources.

The heating device may be, at least in part, arranged in combination with the print head of the inkjet printer, travelling therewith so that the radiation is applied very shortly after jetting. In such a case, the inkjet printer is preferably equipped with some kind of infrared radiation source, e.g. an infrared light source, such as infrared laser diodes or infrared LEDs.

A preferred effective infrared radiation source has an emission maximum between 0.8 and 1.5 μm. Such an infrared radiation source is sometimes called a NIR radiation source or NIR dryer. In a preferred form the NIR radiation source is in the form of NIR LEDs, which can be mounted easily on a shuttling system of a plurality of inkjet print heads in a multi-pass inkjet printing device.

NIR-radiation energy quickly enters into the depth of the inkjet ink layer and removes water and solvents out of the whole layer thickness, while conventional infrared and thermo-air energy is predominantly absorbed at the surface and is then slowly conducted into the ink layer, which results usually in a slower removal of water and solvents.

The jetting step (a) and the UV curing step (b) may be repeated two, three, four or more times before the etching step c) to obtain a sufficiently thick and etch resistant UV cured image. Alternatively, the jetting step (a) is repeated two, three, four or more times before the curing step (b), also to obtain a sufficiently thick and etch resistant UV cured image.

The etching step (c) may also be repeated two, three or more times to obtain a sufficient etch depth.

According to another embodiment of the method, a UV curable inkjet ink containing a colorant is jetted on at least part of the etched image. Adding colours to at least part of the etched image may further increase the decorative value of the image. Preferably, a white base layer is first applied to the area where colours will be printed.

The UV cured image is stripped from the glass surface and fragmented into large flakes in an alkaline stripping solution. The flakes preferably have a size between 5 and 10 mm. This stripping method avoids problems of clogging of filters by UV cured image flakes.

The etched glass article (10) obtained with the method according to the invention thus comprises (i) regions which are etched (4), corresponding to the regions which were not covered beforehand by the UV cured image (3), that is to say corresponding to the "negative" of the UV cured image, and (ii) smooth regions (6), corresponding to the regions which were covered by the UV cured image ((2).

The desired pattern(s) on the glass articles may be formed by the etched regions (4) or alternatively by the smooth regions (6).

The pattern can be a logo, characters, texts, a drawing, and the like. The glass article manufactured by the method according to the invention may comprise just on pattern or, alternatively, several identical or different patterns distributed over the glass article.

An etched glass is normally characterized by its roughness and in particular by the Rz (Mean Roughness Depth) and Rsm (Mean width of profile elements) parameters (expressed in µm) and the ratio Rz/Rsm between these two parameters. According to one embodiment, the etched regions (4) of the glass article obtained according to the method of the invention exhibit a preferred surface roughness defined by an Rz value of greater than 9 µm and less than 22 µm and an Rz/Rsm ratio of greater than 0.12 and less than 0.30.

Depending on the roughness obtained, the selectively etched glass sheet can have different applications. For example, it can be used for decorative applications or, if the roughness obtained is high, for applications as non-slip flooring, floor or staircase step.

Glass Substrates

The glass article is made of glass which may belong to various categories.

The glass can thus be a glass of soda-lime-silica type, a borate glass, a lead glass, a glass comprising one or more additives homogeneously distributed in its body, such as, for example, an inorganic colorant, an oxidizing compound, a viscosity-regulating agent and/or an agent which facilitates melting.

Preferably, the glass is of soda-lime-silica type.

The glass can be clear, extra-clear or coloured in its body.

A glass surface means planar as well as non-planar external surfaces of glass articles.

The manufacturing method according to the invention is preferably used for planar surfaces, especially for glass sheets.

Glass sheets can be a completely smooth glass sheets or an already etched glass sheet.

According to a preferred embodiment, the glass sheet is a float glass sheet. Highly preferred, the glass sheet is a float glass sheet of soda-lime-silica type.

The glass sheet can have any thickness. The thickness preferably ranges from 0.7 to 20 mm.

The manufacturing method according to the invention is particularly well-suited to selectively etch large surface areas of glass, for example glass sheets of which the surface area is at least 5 m$^2$.

However, the method may also be used to selectively etch smaller surface areas, for example surface areas of the order of 0.5 m$^2$.

The glass sheet may be thermally or chemically tempered, annealed or hardened.

In order to observe certain safety standards, the glass sheet may be laminated, i.e. it is rolled with another glass sheet by means of a thermoplastic film.

In the method according to the invention, one surface or both surfaces of a glass sheet may be selectively etched to form a pattern on one or both surfaces of the glass sheet.

Preferably, a pattern is formed on one surface of a glass sheet. When etching is carried out by dipping the glass sheet in an etch solution, one surface of the glass sheet is completely covered by a protective layer to protect that surface from the etch solution. Such a protective layer may be applied on the glass surface by any suitable application method, however it is preferred that such a protective layer is also applied by jetting and curing the UV curable inkjet ink used to form the image on the other surface of the glass sheet.

Etching

The etching solution used in the etching step of the method according to the invention is preferably an aqueous solution of hydrofluoric acid.

Typically, the etching solution has a pH between 0 and 5.

The acidic etching solution may further comprise, in addition to the hydrofluoric acid itself, salts of this acid, other acids, such as HCl, $H_2SO_4$, $HNO_3$, acetic acid, phosphoric acid and/or their salts (for example, $Na_2SO_4$, $K_2SO_4$, $(NH_4)_2SO_4$, $BaSO_4$, and the like), and optional adjuvants (e.g. acid/base buffer compounds, or compounds facilitating spreading of the solution) in minor proportions.

Alkaline salts and ammonium salts are preferred such as for example sodium, potassium and ammonium hydrofluoride or bifluoride.

The etching time, i.e. the time the glass plate is immersed in the etching solution, may vary as function of the etching solution used and of the amount of glass that has to be removed.

For reasons of productivity, the etching is preferably performed in a time frame of less than an hour, preferably in a time frame of 5 to 45 minutes, more preferably 10 to 30 minutes.

An increase in temperature generally accelerates the etching. Etching is preferably performed at a temperature between 20 and 50° C., more preferably at room temperature.

Etching may be performed by spraying, preferably at a pressure of at least 1 bar, more preferably 1 to 2 bar.

In a preferred embodiment, etching is performed by dipping the glass sheet containing the UV cured image in an etch solution. For example, the glass sheet may be conveyed with a certain speed through a dipping tank containing an etching solution.

Etching may be performed in one step or in two, three, or more etching steps.

When multiple etching steps are used, all etching steps may have the same operating conditions, i.e. the same etching solution, etching time and etching temperature) or the etching steps may have different operating conditions.

Etching is preferably followed by rinsing with water to remove any residual etchant.

Before etching, the UV curable inkjet printed image is preferably given a heat treatment, preferably 10 to 45 minutes at 130 to 170° C., more preferably 20 to 30 minutes at 150° C.

Etching is preferably followed by rinsing with water to remove any residual etchant.

After etching, the UV cured image is preferably removed in an alkaline stripping solution. Such an alkaline stripping solution is usually an aqueous solution with a pH>10.

Stripping

The stripping solution or stripping bath is preferably an alkaline solution containing soda, potassium carbonate, alkaline metal hydroxides, such as sodium or potassium hydroxide, or based on amines such as mono or tri ethanolamine and tetra methyl ammonium hydroxide. A preferred stripping solution contains at least 2 wt % of sodium or potassium hydroxide. The stripping solution in use preferably has a temperature between 30° C. and 85° C., more preferably 40° C. to 55° C. The stripping solution is preferably substantially free of organic solvent and most preferably contains no organic solvent.

In a preferred embodiment, spraying is used to apply the stripping solution. Implementing pressure by using spraying during stripping will increase the stripping speed and improves the degradation speed of the flakes.

The equipment for performing the etching and the stripping is dependent on the application and the dimensions of the glass article.

An etch bath may be used through which the glass article carrying the cured UV cured image(s) is transported at a controlled speed. A simple bath for etching wherein the glass substrate is submersed in the etchant liquid for a certain time and heated at a certain temperature is the most straight forward concept of a suitable apparatus.

UV Curable Inkjet Inks

A UV curable inkjet ink is printed on the glass surface and UV cured to form a UV cured image that protects the glass surface from the etching solution to which it adheres.

The UV curable inkjet ink may be cationically curable, but is preferably a free radical UV curable inkjet ink. The UV curable inkjet ink can be cured by e-beam, but is preferably cured by UV light, more preferably by UV light from UV LEDs.

For reliable industrial inkjet printing, the viscosity of the UV curable inkjet inks is preferably no more than 20 mPa·s at 45° C., more preferably between 1 and 18 mPa·s at 45° C., and most preferably between 4 and 14 mPa·s at 45° C.

For good image quality and adhesion, the surface tension of the UV curable inkjet inks is preferably in the range of 18 mN/m to 70 mN/m at 25° C., more preferably in the range of about 20 mN/m to about 40 mN/m at 25° C.

A UV curable inkjet ink according to a preferred embodiment of the invention comprises a polymerizable composition, wherein at least 80 wt %, preferably at least 90 wt % and most preferably 100 wt % of the polymerizable composition consists of:
a) 15.0 to 70.0 wt % of an acryl amide;
b) 20.0 to 75.0 wt % of a polyfunctional acrylate; and
c) 1.0 to 15.0 wt % of a monofunctional (meth)acrylate containing a carboxylic acid group, a phosphoric acid group or a phosphonic acid group; with all weight percentages (wt %) based on the total weight of the polymerizable composition.

Acryl Amides

The UV curable inkjet ink according to the invention includes at least 15.0 to 70.0 wt %, preferably at least 20.0 to 65.0 wt % and most preferably at least 30.0 to 60.0 wt % of an acryl amide in the polymerizable composition, with all weight percentages (wt %) based on the total weight of the polymerizable composition.

A single acryl amide or a mixture of acryl amides may be used.

Preferred acryl amides are disclosed in Table 1.

TABLE 1

| AA-1 | 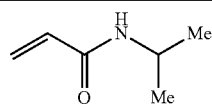 |
| AA-2 | 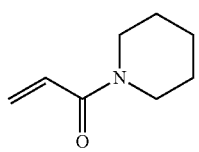 |

TABLE 1-continued

| AA-3 | 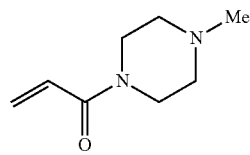 |
| AA-4 | 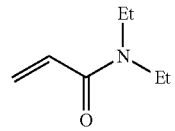 |
| AA-5 | 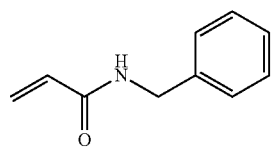 |
| AA-6 | 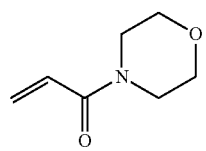 |
| AA-7 | 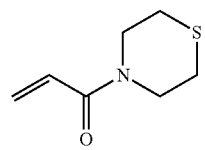 |
| AA-8 | 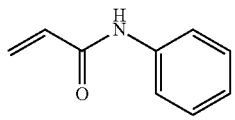 |
| AA-9 | 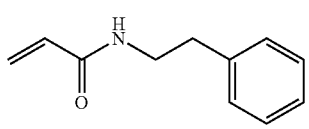 |
| AA-10 | 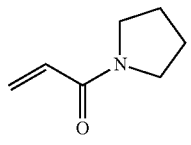 |

In a preferred embodiment of the UV curable inkjet ink, the acryl amide is a cyclic acryl amide.

In the most preferred embodiment of the UV curable inkjet ink, the acryl amide is acryloyl morpholine.

Polyfunctional Acrylates

The UV curable inkjet ink according to the invention includes at least 20.0 to 75.0 wt %, preferably at least 30.0 to 65.0 wt % and most preferably at least 40.0 to 55.0 wt % of a polyfunctional acrylate in the polymerizable composition, with all weight percentages (wt %) based on the total weight of the polymerizable composition.

A single polyfunctional acrylate or a mixture of polyfunctional acrylates may be used.

In a preferred embodiment, the polyfunctional acrylate is selected from the group consisting of dipropylene glycol diacrylate, neopentylglycol diacrylate, neopentylglycol (2× propoxylated) diacrylate, penta erythritol tetraacrylate, 1,6- hexanediol diacrylate, trimethylolpropane triacrylate, ethoxylated trimethylolpropane triacrylate, tripropylene glycol diacrylate, ditrimethyloylpropane tetraacrylate, ethoxylated pentaerythritol tetraacrylate, and polyethyleneglycol diacrylate.

In the most preferred embodiment of the UV curable inkjet ink, the polyfunctional acrylate includes a neopentylglycol hydroxy pivalate diacrylate.

Acid Group Containing (Meth)Acrylates

The UV curable inkjet ink according to the invention includes at least 1 to 15 wt %, preferably at least 2 to 12 wt % and most preferably at least 4 to 8 wt % of a (meth) acrylate containing a carboxylic acid group, a phosphoric acid group or a phosphonic acid group in the polymerizable composition, with all weight percentages (wt %) based on the total weight of the polymerizable composition.

Suitable examples of the carboxylic acid group-containing monofunctional (meth)acrylate include a compound represented by the Formula (I):

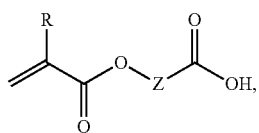

Formula (I)

wherein, R represents a hydrogen atom or a methyl group, preferably a hydrogen atom; and Z represents a divalent organic group.

Preferred examples of Z are —(CH2)n-* [wherein n represents an integer of 2 to 12]; *—CH2-CH2-O—CO—Z'—* [wherein Z' represents a divalent organic group selected from the following]; *—C6H4-*; *—C6H4-(CH2)n-* [wherein n represents an integer of 1 to 12]; *—(CH2)n-C6H4-* [wherein n represents an integer of 1 to 12]; and *—(CH2)n-O—C6H4-* [wherein n represents an integer of 1 to 12]; and wherein * represents a linking site.

Preferred examples of the (meth)acrylate containing a carboxylic acid group are disclosed in Table 2.

TABLE 2

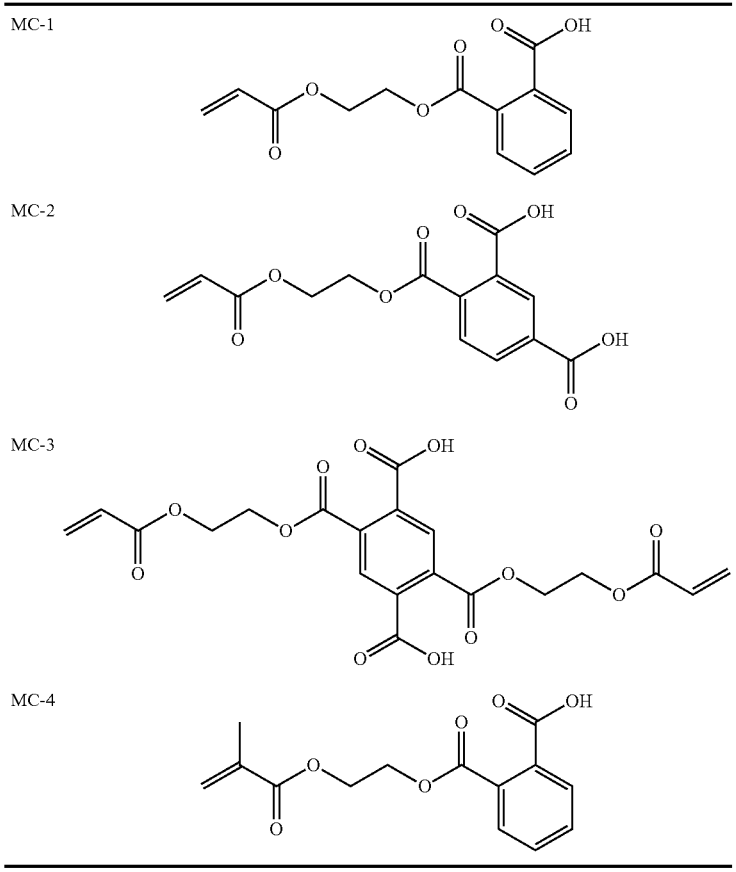

Preferred examples of the (meth)acrylate containing a phosphoric acid group or a phosphonic acid group include 2-(methacryloyloxy) ethyl phosphate, hydroxyethyl methacrylate phosphate, bis-(2-methacryloyl oxyethyl) phosphate.

Preferred examples of the (meth)acrylate containing a phosphoric acid group are compounds according to Formula P-1 or P-2:

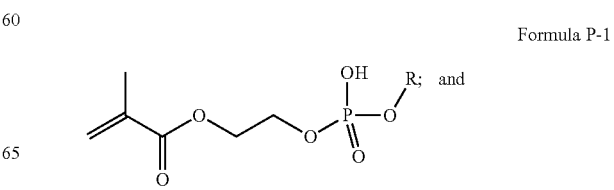

Formula P-1

-continued

Formula P-2

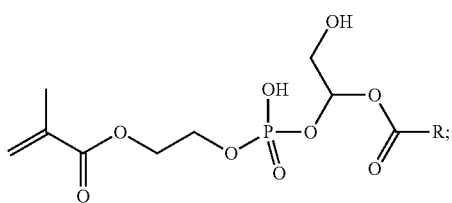

wherein R represents $C_nH_{2n+1}$ with n representing an integer between 6 and 18.

Preferred examples of the (meth)acrylate containing a phosphoric acid group are disclosed in Table 3.

TABLE 3

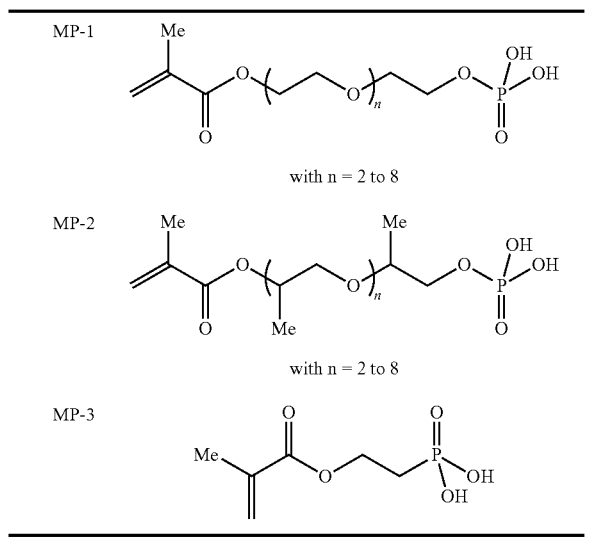

In a particularly preferred embodiment of the UV curable inkjet ink, the (meth)acrylate containing a carboxylic acid group, a phosphoric acid group, or a phosphonic acid group is selected from the group consisting of: 2-carboxyethyl acrylate, 2-acryloyl ethyl succinate, and 2-hydroxyethyl methacrylate phosphate.

Other Polymerizable Compounds

Other polymerizable compounds than the ones above may be present in the UV curable inkjet ink in an amount of 0 to 20 wt %, more preferably up to 15 wt % and most preferably in an amount of up to 10 wt % with all weight percentages (wt %) based on the total weight of the polymerizable composition.

The other polymerizable compounds may be monomers, oligomers and/or prepolymers. These monomers, oligomers and/or prepolymers may possess different degrees of functionality. A mixture including combinations of mono-, di-, tri- and higher functionality monomers, oligomers and/or prepolymers may be used. The viscosity of the UV curable inkjet ink may be adjusted buy varying the ratio between the monomers and oligomers.

Particularly preferred other monomers and oligomers are those listed in [0106] to [0115] in EP-A 1911814.

Colorants

The UV curable inkjet may be a substantially colourless inkjet ink, but preferably the UV curable inkjet ink includes at least one colorant. The colorant makes the temporary mask clearly visible to the manufacturer of conductive patters, allowing a visual inspection of quality.

The colorant in the cured inkjet ink pattern on the glass sheet and the UV curable inkjet ink may be a pigment or a dye, but is preferably a dye that is not bleached by the UV curing step during the inkjet printing process of the UV curable inkjet ink.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO2008/074548.

Pigment particles in inkjet inks should be sufficiently small to permit free flow of the ink through the inkjet-printing device, especially at the ejecting nozzles. It is also desirable to use small particles for maximum colour strength and to slow down sedimentation. Most preferably, the average pigment particle size is no larger than 150 nm. The average particle size of pigment particles is preferably determined with a Brookhaven Instruments Particle Sizer BI90plus based upon the principle of dynamic light scattering.

Generally dyes exhibit a higher light fading than pigments, but cause no problems on jettability. It was found that anthraquinone dyes exhibit only minor light fading under the normal UV curing conditions used in UV curable inkjet printing.

In a preferred embodiment, the colorant in the UV curable inkjet ink is an anthraquinone dye, such as Macrolex™ Blue 3R (CASRN 325781-98-4) from LANXESS.

Other preferred dyes include crystal violet and a copper phthalocyanine dye.

In a preferred embodiment, the colorant is present in an amount of 0.5 to 6.0 wt %, more preferably 1.0 to 2.5 wt %, based on the total weight of the UV curable inkjet ink.

Polymeric Dispersants

If the colorant in the UV curable inkjet ink is a pigment, then the UV curable inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP-A 1911814.

Commercial examples of polymeric dispersants are the following:
- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Photoinitiators and Photoinitiating Systems

The UV curable inkjet ink contains at least one photoinitiator, but may contain a photoinitiating system including a plurality of photoinitiators and/or co-initiators.

The photoinitiator in the UV curable inkjet ink is preferably a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J.V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzyl dimethylketal, bis (2,6-dimethylbenzoyl)-2,4,4-trimethylpentylphosphine oxide, 2,4,6 trimethylbenzoyl-diphenylphosphine oxide, 2,4,6-rimethoxybenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

The photoinitiator may be a so-called diffusion hindered photoinitiator. A diffusion hindered photoinitiator is a photoinitiator which exhibits a much lower mobility in a cured ink layer than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator for the UV curable inkjet ink is preferably selected from the group consisting of non-polymeric multifunctional photoinitiators, oligomeric or polymeric photoinitiators and polymerizable photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiator selected from the group consisting of benzoinethers, benzil ketals, $\alpha,\alpha$-dialkoxyacetophenones, $\alpha$-hydroxyalkylphenones, $\alpha$-aminoalkylphenones, acylphosphine oxides, acylphosphine sulphides, $\alpha$-haloketones, $\alpha$-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP-A 2065362 in paragraphs [0074] and [0075] for difunctional and multifunctional photoinitiators, in paragraphs [0077] to [0080] for polymeric photoinitiators and in paragraphs[0081] to [0083] for polymerizable photoinitiators.

A preferred amount of photoinitiator is 0.1-20 wt %, more preferably 2-15 wt %, and most preferably 3-10 wt % of the total weight of the UV curable inkjet ink.

In order to increase the photosensitivity further, the UV curable inkjet ink may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethyl-aminobenzoate, 2-n-butoxyethyl-4-(dimethylamino) benzoate, 2-(dimethylamino)-ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

When one or more co-initiators are included into the UV curable inkjet ink, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth) acrylate group, more preferably having at least one acrylate group.

The UV curable inkjet ink preferably includes a polymerizable or polymeric tertiary amine co-initiator.

Preferred diffusion hindered co-initiators are the polymerizable co-initiators disclosed in EP-A 2053101 in paragraphs [0088] and [0097].

The UV curable inkjet inks preferably includes the (diffusion hindered) co-initiator in an amount of 0.1 to 20 wt %, more preferably in an amount of 0.5 to 15 wt %, most preferably in an amount of 1 to 10 wt % of the total weight of the UV curable inkjet ink.

Polymerization Inhibitors

The UV curable inkjet ink may contain at least one inhibitor for improving the thermal stability of the ink.

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol, 2,6-di-tert.butyl-4-methylphenol (=BHT) may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

The inhibitor is preferably a polymerizable inhibitor.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total UV curable inkjet ink.

Surfactants

The UV curable inkjet ink may contain at least one surfactant, but preferably no surfactant is present. If no surfactant is present, the UV curable inkjet ink does not spread well on the glass sheet allowing the generation of thin conductive lines.

The surfactant can be anionic, cationic, non-ionic, or zwitter-ionic and is usually added in a total quantity less than 1 wt % based on the total weight of the UV curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoric surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferably the surfactant is present in the UV curable inkjet ink in an amount of 0 to 3 wt % based on the total weight of the UV curable inkjet ink.

Preparation of Inkjet Inks

The preparation of pigmented UV curable inkjet inks is well-known to the skilled person. Preferred methods of preparation are disclosed in paragraphs [0076] to [0085] of WO2011/069943.

Inkjet Printing Devices

The UV curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the metal plate. In a single pass printing process the inkjet print heads usually remain stationary and the metal substrate is transported under the inkjet print heads.

For glass substrates which are not essentially two dimensional like a glass sheet, i.e. having a three dimensional shape like a sphere or more complex objects like a combination of a cylinder with a cube, the print head may be mounted on a robotic arm which is able to follow the shape of the three dimensional object to apply the UV curable inkjet ink. Such technology is known in the art, e.g. US 2015042716, WO 2014/001850 and US 2015009254.

Suitable inkjet printers that may be used in the method according to the invention are for example the Anapurna M series printers available from Agfa Graphics.

Curing Devices

The UV curable inkjet ink can be cured by exposing them to actinic radiation, such as electron beam or ultraviolet radiation, preferably the image of UV curable inkjet ink is cured by ultraviolet radiation, more preferably using UV LED curing.

In inkjet printing, the curing means may be arranged in combination with the print head of the inkjet printer, travelling therewith so that the curable liquid is exposed to curing radiation very shortly after been jetted.

In such an arrangement, with the exception of UV LEDs, it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

In a preferred embodiment, the UV curable inkjet ink is cured by UV LEDs. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure the ink image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as ALDRICH CHEMICAL Co. (Belgium) and ACROS (Belgium) unless otherwise specified. The water used was deionized water.

Dye-1 is a blue anthraquinone dye available as Macrolex™ Blue 3R from LANXESS.

ITX is Darocur™ ITX is an isomeric mixture of 2- and 4-isopropylthioxanthone from BASF.

EPD is ethyl 4-dimethyaminobenzoate available as Genocure™ EPD from RAHN.

TPO is 2,4,6-trimethylbenzoyl-diphenyl-phosphineoxide available as Darocur™ TPO is from BASF.

BAPO is phenyl bis(2,4,6-trimethylbenzoyl)-phosphine oxide available from BASF.

Irgacure™ 907 is 2-methyl-1-[4-(methylthio)phenyl]-2-morpholino-propan-1-one, a photoinitiator available from BASF.

INHIB is a mixture forming a polymerization inhibitor having a composition:

TABLE 4

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

Macrolex™ Blue 3R is a blue anthraquinone dye from LANXESS.

DPGDA is dipropylene glycol diacrylate available as Sartomer™ SR508 from SARTOMER.

2-HEA is 2-hydroxy ethyl acrylate from ALDRICH.

MADAME is N,N-dimethyl 2-aminoethyl methacrylate available as Norsocryl™ MADAME from ARKEMA France.

EOEOEA is ethoxyethoxy ethylacrylate available as Sartomer™ SR256 from SARTOMER.

ACMO is acryloyl morpholine available from RAHN.

VEEA or 2-(2-vinyloxy-ethoxy)-ethyl acrylate was supplied by Nippon Shokubai.

IDA is isodecylacrylate available as Sartomer™ SR395 from SARTOMER.

SR606A is a neopentylglycol hydroxyl pivalate diacrylate available as Sartomer™ SR606A from SARTOMER.

HDDA is 1,6-hexanediol diacrylate available as Sartomer™ SR238 from SARTOMER.

TMPTA is trimethylolpropane trimethacrylate available as Sartomer™ SR350 from SARTOMER.

NPGDA is neopentylglycol (2× propoxylated) diacrylate available as Sartomer™ SR9003 from SARTOMER PETA is penta erythritol tetraacrylate available as Sartomer 295 from Sartomer.

CEA is 2-carboxyethyl acrylate from ALDRICH.

SR9054 is 2-hydroxyethyl methacrylate phosphate available as Sartomer™ SR9054 from SARTOMER.

CN146 is 2-acryloxyethyl hydrogen phthalate available as Sartomer™ CN146 from SARTOMER.

Measurement Methods

1. Etch Resistance (ER)

The etch resistance was evaluated by controlling if the ink layer was still present after etching and rinsing. Evaluation was made in accordance with a criterion described in Table 5.

TABLE 5

| Evaluation | Criterion |
|---|---|
| OK | Layer is still completely present |
| Not OK | Layer is (partly) removed |

2. Strippability (SB) and Flakes

The strippability (SB) was determined using the etched and dried samples by submitting them into a beaker containing a 2% NaOH-solution at 50° C. while stirring. The time of release of the inkjetted layer from the glass surface, i.e. the release time, was measured.

Once the release of the inkjetted layer started, the formation of flakes is observed. Evaluation was made in accordance with a criterion described in Table 6

TABLE 6

| Evaluation | Criterion |
| --- | --- |
| OK | Flake formation within 5 minutes |
| Moderate | Flake formation within 8 minutes |
| Not OK | No break-down of the inkjetted layer within 20 minutes |

3. Viscosity

The viscosity of the formulations was measured at 45° C. using a "Robotic Viscometer Type VISCObot" from CAMBRIDGE APPLIED SYSTEMS.

4. Cure Speed

After printing and curing on the copper plates, the inkjetted layer was evaluated by touch of a finger. Evaluation was made in accordance with a criterion described in Table 7.

TABLE 7

| Evaluation | Criterion |
| --- | --- |
| OK | Layer feels not tacky |
| Not OK | Layer feels tacky or even wet |

Example 1

This example illustrates the manufacturing of an etched glass article using UV curable inkjet ink printing.

A glass plate was cleaned with a cotton pad dipped in isopropanol to remove dust and grease particles from the glass surface.

After drying, an image was printed with an inkjet ink having the composition of Table 8 on the glass plate with a MJK2013 inkjet printer equipped with Konica Minolta 1024 print heads at 6 µL drop volume in 8 passes (1440×1440 dpi), resulting in a 16 µm thick image. The image was then cured by means of a SubZero LED090, from Integration Technology (395 nm-7 W/cm$^2$).

TABLE 8

| wt % of component: | COMP-01 |
| --- | --- |
| Dye-1 | 1.00 |
| ITX | 4.00 |
| TPO | 2.95 |
| EPD | 4.00 |
| INHIB | 1.00 |
| ACMO | 37.50 |
| CEA | 3.00 |
| CN146 | 4.00 |
| SR606A | 42.55 |

An additional heat treatment of 30 minutes at 150° C. was given to the cured image.

The glass plate was then immersed in an etching solution having a composition as shown in Table 9 during 1-2 minutes at room temperature.

TABLE 9

| Ingredient | Amount (g) |
| --- | --- |
| Water | 18.4 |
| ammonium hydrofluoride | 23.5 |
| oxalic acid | 12.4 |
| ammonium sulphate | 15.7 |
| glycerine | 6.5 |
| Barium sulphate | 23.5 |

The glass substrate was then rinsed with clear water and dried.

The obtained etching depth was between 0.06 and 0.1 mm.

The etched glass plate was then subjected for 2 minutes at 50° C. to an alkaline strip bath (containing 7% ethanolamine) and then rinsed for 90 seconds with water and dried.

Figure 3:
FIG. 3 shows a photograph of an etched glass sheet obtained in example 1.

A mat image was formed in the glass leaving a decorative pattern. An example of such an image is shown in FIG. 3.

Example 2

Preparation of the UV Curable Inkjet Inks

The comparative UV curable inkjet ink COMP-1 was prepared according to a composition of Table 10. The weight percentages (wt %) were all based on the total weight of the UV curable inkjet ink.

TABLE 10

| wt % of component: | COMP-01 |
| --- | --- |
| Dye-1 | 1.00 |
| ITX | 4.00 |
| TPO | 4.00 |
| EPD | 4.00 |
| INHIB | 1.00 |
| DPGDA | 56.00 |
| NVL | 15.00 |
| PEA | 15.00 |

The comparative UV curable inkjet ink COMP-2 to COMP-12 and the inventive UV curable ink INV-1 to INV-16 were prepared according to a composition of Type A or B in Table 11. The weight percentages (wt %) were all based on the total weight of the UV curable inkjet ink.

TABLE 11

| | wt % in the inkjet ink | |
| --- | --- | --- |
| Components | Type A | Type B |
| Dye-1 | 1.00 | 1.75 |
| Polymerizable composition according to Table 12 | 86.00 | 82.25 |
| ITX | 4.00 | 5.00 |
| EPD | 4.00 | — |
| TPO | 4.00 | 2.00 |
| BAPO | — | 3.00 |
| Irgacure ™ 907 | — | 5.00 |
| INHIB | 1.00 | 1.00 |

The amount and type of monomers used in the polymerizable composition of the inkjet inks are shown in Table 12. The weight percentages (wt %) in Table 12 were all based on the total weight of the polymerizable composition. The viscosity was measured and is shown in Table 14.

TABLE 12

Polymerizable Composition for Table 11

| Inkjet Ink Sample | Type | Acryl Amide | wt % | Polyfunctional acrylate | wt % | Acid acrylate | wt % |
|---|---|---|---|---|---|---|---|
| COMP-2 | A | 2-HEA | 47.7 | SR606A | 46.5 | CEA | 5.8 |
| COMP-3 | A | MADAME | 47.7 | SR606A | 46.5 | CEA | 5.8 |
| COMP-4 | A | EOEOEA | 47.7 | SR606A | 46.5 | CEA | 5.8 |
| COMP-5 | A | 2-HEA | 47.7 | DPGDA | 46.5 | CEA | 5.8 |
| COMP-6 | A | MADAME | 47.7 | DPGDA | 46.5 | CEA | 5.8 |
| COMP-7 | A | EOEOEA | 47.7 | DPGDA | 46.5 | CEA | 5.8 |
| COMP-8 | A | ACMO | 53.5 | SR606A | 46.5 | CEA | 0.0 |
| COMP-9 | B | VEEA | 48.9 | SR606A | 45.0 | CEA | 6.1 |
| COMP-10 | B | IDA | 48.9 | SR606A | 45.0 | CEA | 6.1 |
| COMP-11 | B | ACMO | 8.8 | SR606A | 85.1 | CEA | 6.1 |
| COMP-12 | A | ACMO | 30.2 | SR606A | 46.5 | SR9054 | 23.3 |
| INV-1 | A | ACMO | 47.7 | SR606A | 46.5 | CEA | 5.8 |
| INV-2 | A | ACMO | 53.5 | SR606A | 40.7 | CEA | 5.8 |
| INV-3 | A | ACMO | 59.3 | SR606A | 34.9 | CEA | 5.8 |
| INV-4 | A | ACMO | 65.1 | SR606A | 29.1 | CEA | 5.8 |
| INV-5 | A | ACMO | 50.6 | SR606A | 46.5 | CEA | 2.9 |
| INV-6 | A | ACMO | 52.3 | SR606A | 46.5 | CEA | 1.2 |
| INV-7 | A | ACMO | 47.7 | DPGDA | 46.5 | CEA | 5.8 |
| INV-8 | A | ACMO | 47.7 | HDDA | 46.5 | CEA | 5.8 |
| INV-9 | A | ACMO | 47.7 | NPGDA | 46.5 | CEA | 5.8 |
| INV-10 | A | ACMO | 47.7 | TMPTA | 46.5 | CEA | 5.8 |
| INV-11 | A | ACMO | 47.7 | PETA | 46.5 | CEA | 5.8 |
| INV-12 | B | ACMO | 33.1 | SR606A | 60.8 | CEA | 6.1 |
| INV-13 | B | ACMO | 21.0 | SR606A | 72.9 | CEA | 6.1 |
| INV-14 | A | ACMO | 41.9 | SR606A | 46.5 | CEA | 11.6 |
| INV-15 | A | ACMO | 47.7 | SR606A | 46.5 | SR9054 | 5.8 |
| INV-16 | A | ACMO | 41.9 | SR606A | 46.5 | SR9054 | 11.6 |

Evaluation and Results

A glass plate was cleaned with a cotton pad dipped in isopropanol to remove dust and grease particles.

After drying an image was printed on the glass plate with the UV curable inkjet inks COMP-01 to COMP-11 and INV-01 to INV-16 using an Anapurna Mw inkjet printer (commercially available from Agfa Graphics NV) equipped with Konica Minolta 512M print heads at 14 µL drop volume in 8 passes (720×1440 dpi). The image was then cured by means of a Hg lamp.

An additional heat treatment of 30 minutes at 150° C. was given to the cured image.

The glass plate was then immersed in an etching solution of which the composition is shown in Table 13 during 5 minutes at room temperature.

TABLE 13

| Ingredient | Amount (wt %) |
|---|---|
| Water | 25 |
| Ammonium hydrofluoride | 50 |
| Sulfuric acid (concentrated) | 6 |
| Hydrogen fluoride (50 wt % aqueous solution) | 6 |
| Potassium sulphate | 10 |
| Ammonium sulphate | 3 |

The etched glass plate was subjected for 5 minutes at 50° C. to an alkaline strip bath (containing 2% NaOH), then rinsed for 90 seconds with water, dried, and evaluated for strippability and the shape of the stripped ink layer. The results are shown in Table 14.

TABLE 14

| Inkjet Ink | Viscosity (mPa · s) | Cure Speed | Etch Resistance | Strippability | Flakes |
|---|---|---|---|---|---|
| COMP-1 | 5.5 | OK | OK | OK | Not OK |
| COMP-2 | 6 | OK | Not OK | NA | NA |
| COMP-3 | 4 | Not OK | OK | OK | OK |
| COMP-4 | 5 | OK | Not OK | NA | NA |
| COMP-5 | 5 | OK | Not OK | NA | NA |
| COMP-6 | 3 | Not OK | OK | OK | OK |
| COMP-7 | 4 | OK | Not OK | NA | NA |
| COMP-8 | 8 | OK | OK | Not OK | OK |
| COMP-9 | 7 | OK | OK | Not OK | OK |
| COMP-10 | 7 | OK | OK | Not OK | OK |
| COMP-11 | 15 | OK | OK | Not OK | Moderate |
| COMP-12 | 18 | OK | Not OK | NA | NA |
| INV-1 | 9 | OK | OK | OK | OK |
| INV-2 | 9 | OK | OK | OK | OK |
| INV-3 | 9 | OK | OK | OK | OK |
| INV-4 | 8 | OK | OK | OK | OK |
| INV-5 | 9 | OK | OK | OK | OK |
| INV-6 | 9 | OK | OK | Moderate | OK |
| INV-7 | 7 | OK | OK | OK | OK |
| INV-8 | 6 | OK | OK | OK | OK |
| INV-9 | 6 | OK | OK | OK | OK |
| INV-10 | 13 | OK | OK | OK | OK |
| INV-11 | 20 | OK | OK | OK | OK |
| INV-12 | 14 | OK | OK | OK | OK |
| INV-13 | 14 | OK | OK | OK | OK |
| INV-14 | 11 | OK | OK | OK | OK |
| INV-15 | 10 | OK | OK | OK | OK |
| INV-16 | 11 | OK | OK | OK | OK |

From Table 14, it should be clear that only the UV curable inkjet inks complying with the requirements of claim 1 exhibited excellent results. By replacing the acrylamide ACMO by other monomers that are equally hydrophilic but are (meth)acrylates, or by ignoring the ranges for the acryl amide, the polyfunctional acrylate and the acid monomer, the UV curable inkjet inks failed on one or more of the requirements for manufacturing conductive patterns.

The invention claimed is:

1. A method of manufacturing an etched glass article, the method comprising:
   jetting an image with a UV curable inkjet ink on a surface of a glass article;
   UV curing the image;
   etching a surface of the glass article not covered by the UV cured image to obtain an etched image; and
   removing the UV cured image in an aqueous alkaline solution; wherein
   the UV curable inkjet ink includes a polymerizable composition, and at least 80 wt % of the polymerizable composition consists of:
   a) 15.0 to 70.0 wt % of an acryl amide;
   b) 20.0 to 75.0 wt % of a polyfunctional acrylate; and
   c) 1.0 to 15.0 wt % of a (meth)acrylate including a carboxylic acid group, a phosphoric acid group, or a phosphonic acid group; and
   all weight percentages (wt %) are based on a total weight of the polymerizable composition.

2. The method according to claim 1, wherein the step of UV curing the image is performed with UV LEDs.

3. The method according to claim 1, wherein a time between the steps of jetting the image and UV curing the image is at least 50 ms.

4. The method according to claim 1, further comprising the step of:
   heating the UV cured image before the step of etching.

5. The method according to claim 1, wherein the glass article is a glass sheet.

6. The method according to claim 1, further comprising the step of:
   jetting a second UV curable inkjet ink including a colorant on at least a portion of the etched image.

7. The method according to claim 6, wherein the step of jetting the second UV curable inkjet ink is performed before the step of removing the UV cured image.

8. The method according to claim 1, wherein the acryl amide is a cyclic acryl amide.

9. The method according to claim 8, wherein the cyclic acryl amide is acryloyl morpholine.

10. The method according to claim 1, wherein at least 1.5 wt % of the (meth)acrylate including the carboxylic acid group, the phosphoric acid group, or the phosphonic acid group is present in the polymerizable composition.

11. The method according to claim 1, wherein the (meth)acrylate including the carboxylic acid group, the phosphoric acid group, or the phosphonic acid group is selected from the group consisting of 2-carboxyethyl acrylate, 2-acryloyl ethyl succinate, and 2-hydroxyethyl methacrylate phosphate.

12. The method according to claim 1, wherein the polyfunctional acrylate is selected from the group consisting of dipropylene glycol diacrylate, neopentylglycol diacrylate, neopentylglycol (2× propoxylated) diacrylate, penta erythritol tetraacrylate, 1,6-hexanediol diacrylate, trimethylolpropane trimethacrylate, ethoxylated trimethylolpropane triacrylate, tripropylene glycol diacrylate, ditrimethyloylpropane tetraacrylate, ethoxylated pentaerythritol tetraacrylate, and polyethyleneglycol diacrylate.

13. The method according to claim 1, wherein the polymerizable composition consists of one or more of the acryl amide; one or more of the polyfunctional acrylate; and one or more of the (meth)acrylates including the carboxylic acid group, the phosphoric acid group, or the phosphonic acid group.

14. The method according to claim 1, wherein the UV curable inkjet ink includes 0 to 3 wt % of a surfactant based on a total weight of the UV curable inkjet ink.

15. The method according to claim 1, wherein the polymerizable composition includes one or more compounds selected from the group consisting of acryloyl morpholine, 2-carboxyethyl acrylate, 2-hydroxyethyl methacrylate phosphate, dipropylene glycol diacrylate, pentaerythritol tetraacrylate neopentylglycol diacrylate, neopentylglycol (2× propoxylated) diacrylate, pentaerythritol tetraacrylate, 1,6-hexanediol diacrylate, trimethylolpropane triacrylate, ethoxylated trimethylolpropane triacrylate, tripropyleneglycoldiacrylate, and 2-(2-vinyloxy-ethoxy)-ethyl acrylate.

* * * * *